UNITED STATES PATENT OFFICE.

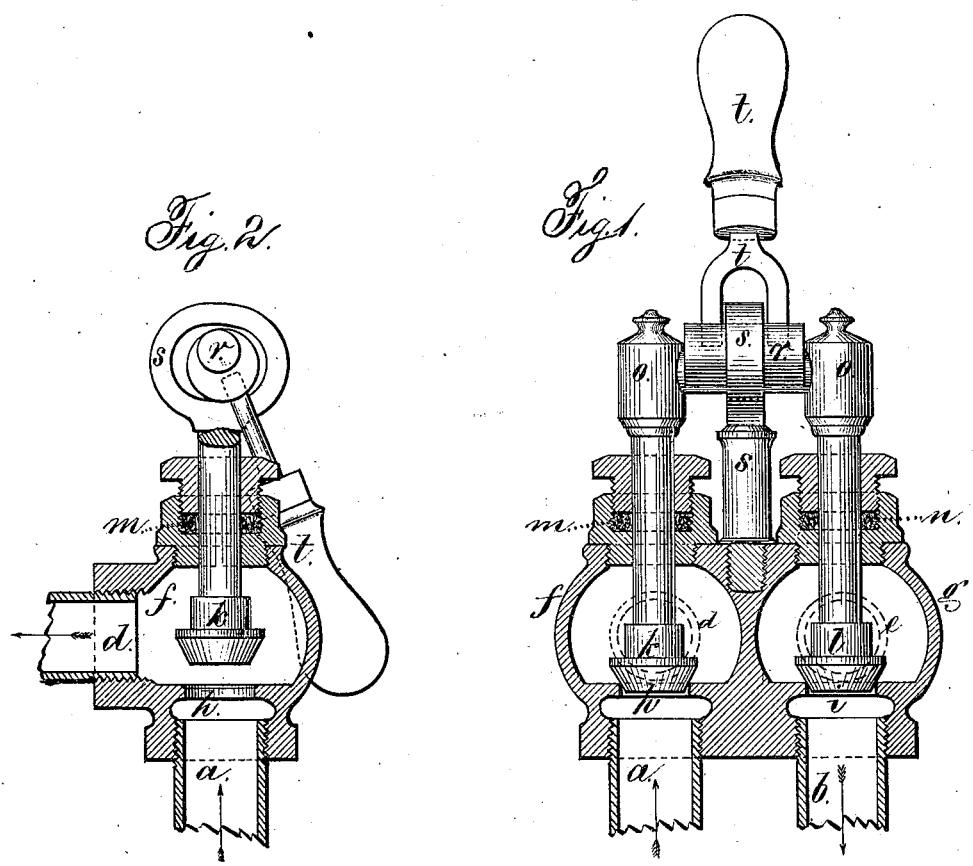

JOHN N. MATLOCK, OF BROOKLYN, ASSIGNOR TO JOHN J. SMITH AND JAMES L. WISE, OF NEW YORK, N. Y.

IMPROVEMENT IN VALVES FOR STEAM-RADIATORS.

Specification forming part of Letters Patent No. 193,529, dated July 24, 1877; application filed July 5, 1877.

*To all whom it may concern:*

Be it known that I, JOHN N. MATLOCK, of Brooklyn, in the county of Kings and State of New York, have invented an Improvement in Valves for Steam-Radiators, of which the following is a specification:

In steam-radiators it is usual to employ two valves—one to admit steam, the other to allow the escape of water of condensation. It is difficult to operate these valves simultaneously, and it often happens that the steam-valve is closed and the water-valve left open, or vice versa. This sometimes causes the water to fill the radiator. A double valve has been made for opening and closing both pipes simultaneously; but it is complicated and difficult to construct.

My invention consists in a double valve-case, with two parallel valve-stems, and an intermediate cam-acting lever, that serves to open or close the two valves simultaneously. This construction is very reliable and simple. It is cheaper than the valves heretofore used, and simultaneous operation is insured.

In the drawing, Figure 1 is a vertical section through the two valves as closed; and Fig. 2 is a vertical section at right angles to Fig. 1, through the steam-valve, in the open position.

The pipe $a$ supplies steam. The pipe $b$ is for the escape of water of condensation. The pipe $d$ leads the steam into the radiator, and a similar pipe (shown by dotted lines at $e$) leads the water of condensation out of the radiator. The valve-cases $f$ and $g$, and seats $h$ and $i$, and valves $k$ and $l$, and packing-glands $m$ and $n$ are of the usual character. Only the two cases $f$ and $g$ are made in piece, and the valve-stems terminate with heads $o$ $o$, into which pass the trunnions of the eccentric or cross-head $r$, that is between the two valve-stems, and passes through the slotted head of the standard or column $s$. There are holes in the eccentric or cam $r$ for the forked end of the lever-handle $t$ in cases where the handle is made removable; but the handle may be made with the eccentric or cam. If desired, the slotted head of the column may be in two parts, with the lever-handle between them. When the eccentric or cam $r$ is partially revolved, its trunnions either raise or depress the valve-stems, and open or close the valves, and the two valves are simultaneously moved, or nearly so, and the proper bearing of each upon its seat is insured, because the slotted head of the column acts as a central resistance to the eccentric that moves the two valves; hence, if one valve closes first, the cross-head $r$ remains stationary at one end, while the other end is moved with the other valve.

It is preferable to make each valve with a loose sleeve, connecting it to the stem, so that it will more easily accommodate itself to the seat.

It will be apparent that the motive power, acting upon the cross-head $r$ to open or close the valves, may be a screw or a rack and pinion instead of the eccentrics.

I claim as my invention—

1. The double valves and their cases, and the inlet and exit pipes, respectively, in combination with a lever and eccentric or cam operating both valves simultaneously, substantially as set forth.

2. The double valve-cases and connections for the respective pipes, in combination with the valves, valve-stems, trunnions, eccentric or cam, standard, and slotted head, substantially as and for the purposes set forth.

3. In combination with double valves, introduced into the compartments of one case, the cross-piece $r$, extending from the head of one valve-stem to the head of the other, to which the power for opening and closing both valves simultaneously is applied, substantially as set forth.

Signed by me this 2d day of July, A. D. 1877.

JOHN N. MATLOCK.

Witnesses:
GEO. T. PINCKNEY,
HAROLD SERRELL.